April 4, 1961 J. M. BARNOTHY 2,978,602
RADIATION MEASURING DEVICE
Filed May 14, 1956
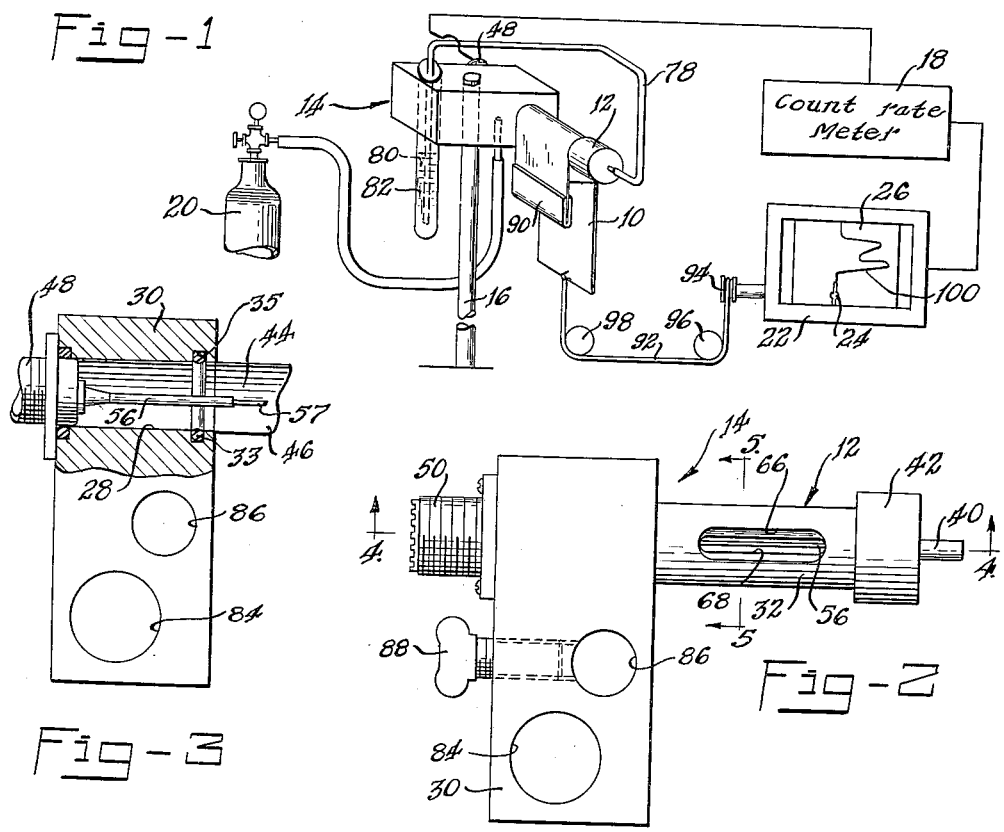
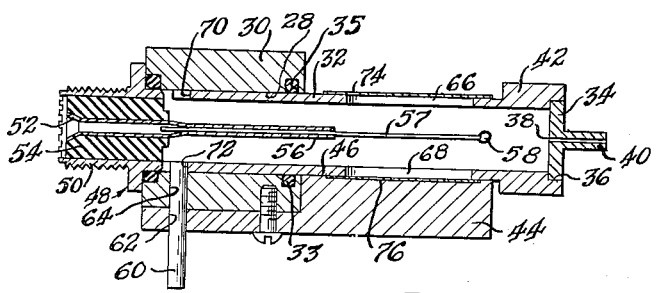
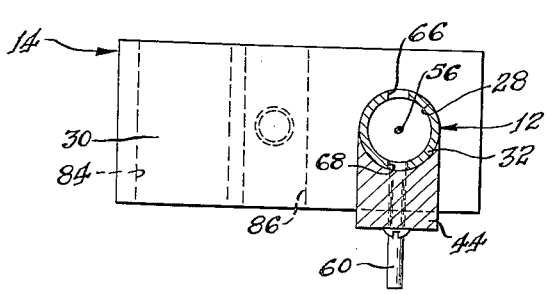
INVENTOR.
Jeno M. Barnothy
BY
Marshall A. Burmeister
Attorney

United States Patent Office 2,978,602
Patented Apr. 4, 1961

2,978,602

RADIATION MEASURING DEVICE

Jenö M. Barnothy, 833 Lincoln St., Evanston, Ill.

Filed May 14, 1956, Ser. No. 584,789

17 Claims. (Cl. 313—93)

The present invention relates to devices for measuring radiation, and particularly devices for measuring the radiation from an elongated strip.

It is desirable under certain circumstances to measure the radiation from radioactive materials disposed along the axis of a strip. For example it is a well known method to determine the elements of a complex chemical compound with the help of paper chromatography. A drop of a solution of the material to be analyzed is placed near the end of a strip of absorbing paper. This end is immersed in a solvent to permit the compound to migrate throughout the paper strip.

Since the migration of the elements depend upon their solubility, each element will migrate in a given time to a distance characteristic for the element. This method of analysis is further described in "Paper Chromatography," by Dr. Friedrich Cramer, Macmillian & Co. Ltd., London, 1954.

The localization of the spot on which one element of the compound accumulated is easy if the element (which itself can be a complex chemical compound) is colored or can be induced to show a color through proper preparation, or shows fluorescence under ultraviolet light.

A newer method is to tag the components of the complex compound with radioactive isotopes, for example to exchange some hydrogen atoms in a chemical compound for tritium atoms. This is done for example in biological experiments. Also, some isotopes of the material to be analyzed are activated through neutron irradiation.

With this method, the spots of a chromatograph strip can be located even if they do not show a color or fluorescence if the strip is scanned with a device sensitive to radioactive rays. Moreover, not only the location of the spots, but also the quantity of the material deposited in each spot can be obtained by determining the total activity of the spot.

It is one of the objects of the present invention to provide a radiation measuring device for measuring the radiation peaks along a strip, and more particularly, a counter adapted to measure the radiation from a strip.

In the usual case, the strip to be scanned for radioactive materials emits radiation in the form of beta particles which have relatively low energy and short mean free paths. This is particularly true in biological experiments where $H^3$, $C^{14}$ and $Ca^{45}$ are the elements to be detected and measured. For this reason, it is exceedingly desirable to provide as short a path as possible between the strip and the active region of the counter. It is also desirable that the counter be operated with as thin a window as possible, or without a window at all. It is a further object of the present invention to provide a counter which is adapted to be disposed immediately adjacent to a strip for radiation measurements.

It is also an object of the present invention to provide a counter which may be operated without a window.

Where the location of radioactivity on a strip is important, it is desirable that the position of the radioactivity on the strip be noted as accurately as possible. If a counter is used for measuring the radiation peaks on the strip, it is desirable that the opening in the counter be relatively small. On the other hand, rapid scanning of a strip for radiation peaks, or the measurement of low intensity radiations, requires a counter having a relatively large opening.

Further, during the process of measuring radiation peaks on a strip, it is often desirable to shift from a relatively large opening to a relatively small opening as the intensity and location of a radiation peak becomes apparent. The transfer from a large opening to a small opening is preferably made without removing the radioactive strip, since in this manner the location of the peak under observation will not be substantially changed. It is therefore a further object of the present invention to provide a counter with a plurality of openings of different sizes which is adapted to measure radiation peaks on a strip, and in which the openings of the counter may be changed without changing the relative position of the counter and the strip.

In all counters, there is a danger of contamination of the active region of a counter by radioactive particles. The active region must be decontaminated if radioactive particles lodge therein, since the presence of the particles will cause the counter to give false indications. This is a particular disadvantage for counters without windows. It is therefore a further object of the present invention to provide a counter which may be readily cleansed of contaminating matter.

A further aim of the invention is to provide a counter in which the counting head can withstand without corrosion decontamination procedures using acids, alkalis and organic solvents. For this purpose the scanning head forming also the cylinder of the counter is made from Monel, stainless steel or brass plated with chromium, or with nickel and chromium.

One aim of the invention is to provide a counter which can be used without window for scanning flexible strips. For this purpose the area around the window opening is of cylindrical shape facing with its convex side toward the strip to be scanned. Through bending the strip around the cylindrical body and pulling with proper force on its two ends, the strip to be scanned seals itself the opening of the counter through which the rays enter preventing thus the escape of the counting gas. The pulling force can be exerted by hand, by clamps of proper weight attached to the ends of the strip to be scanned and by automatic scanning by a weight, as shown in Figure 1, on one side and through the pulling force exerted through the automatic driving mechanism on the other side.

It is an aim of the invention to provide a counter with a thin window for scanning flexible strips in which the strip is in immediate contact with the window in order to increase thus the sensitivity of the counter by eliminating the absorption in the air layer between strip and counter window and increasing simultaneously the effective geometrical opening in which the rays emitted from the strip can reach the active volume of the counter. For this purpose the area around the window is of cylindrical shape facing with its convex side toward the strip to be scanned. Through bending the strip around the counter cylinder, it smoothly follows the curvature of the counter window.

These and additional objects of the invention will be readily apparent to the man skilled in the art from a further reading of the present disclosure, particularly when viewed in the light of the drawings, in which:

Figure 1 is a schematic view of a device illustrating the present invention;

Figure 2 is a plan view of the radioactivity scanner illustrated in Figure 1;

Figure 3 is a fragmentary plan view of the radioactivity scanner, partly in section, with the scanning head removed;

Figure 4 is a sectional view taken along the line 4—4 of Figure 2; and

Figure 5 is a sectional view taken along the line 5—5 of Figure 2.

As illustrated in Figure 1, the flexible tape 10 which is to be scanned, generally a porous paper strip, is disposed over the scanning head 12 of a scanner 14. The scanner 14 is mounted upon a stand 16 and connected to a count rate meter 18. A source of gas 20 is connected to the scanner 14 to provide a suitable ionizing medium within the counting chamber of the scanner. The count rate meter 18 is connected to a recording galvanometer 22 which has a pen 24 which places a trace upon a paper tape 26.

The scanning head 12 of the scanner 14 is disposed slidably within a cylindrical channel 28 extending through a support member 30. The scanning head 12 is formed by a hollow cylindrical tube 32 which forms a snug fit within the channel 28 in the support member 30. In order to assure a gas tight seal, an O-ring gasket 33 is disposed within an annular slot 35 adjacent to the mouth of the channel 28. The end of the tube 32 disposed within the support member 30 is open, and the end of the tube opposite to the support member 30 is closed for example by a cover 34 which is sealed within a recess 36 in this end of the tube. The cover 34 is provided with a central orifice 38, and a stem 40 extends outwardly from the orifice 38. This end of the tube 32 has a diameter greater than the remainder of the tube forming an outwardly extending flange 42, although the invention may be practiced without the flange 42.

The support member 30 is in the form of a rectangular bar disposed normally to the tube 32. A supporting bar 44 is secured to the support member 30 adjacent to the channel 28 and extends outwardly from the support member 30 in abutting relation with the tube 32, the bar 44 terminating adjacent to the flange 42. The surface 46 of the bar 44 which abuts the tube 32 has a radius of curvature equal to that of the channel 28, thus conforming to the tube 32.

A coaxial connector 48 is secured to the support member 30 at the end of the channel 28 opposite the scanning head 12, the connector 48 sealing this end of the channel 28. The connector 48 has an outwardly threaded sleeve 50 which extends from the support member 30 and is constructed of electrically conducting material. It also has an inner longitudinally slotted tube 52 of electrically conducting material which extends into the channel 28. The slotted tube 52 and sleeve 50 are maintained in coaxial relation by an annular insulator 54 which also forms a gas tight seal between the sleeve 50 and tube 52. A straight rod 56 of electrically conducting material is secured to the slotted tube 52 of the coaxial connector 48 and extends along the axis of the tube 32 to a point near the openings 66 and 68. The rod 56 supports an anode wire 57 which extends along the axis of the tube 32 confronting the openings 66 and 68. A ball 58 of electrically conducting material is disposed on the end of the wire 57 and confronts the cover 34 of the scanning head 12. A tube 60 extends through an aperture 62 in the bar 44 and an aperture 64 in the support member 30 to protrude into the channel 28 adjacent to the connector 48.

The tube 32 is provided with a pair of openings 66 and 68 on opposite sides of the tube approximately midway between the support member 30 and the flange 42, although it is to be understood that the invention may be practiced with any number of openings, the shield 44 covering all but one. As illustrated in Figure 4, and Figure 5, one of these openings 68 confronts the bar 44 and the other opening 66 is readily accessible. The openings 66 and 68 are in the form of elongated slots. The opening 66, as illustrated in the figures, is substantially larger than the opening 68. Further, the tube 32 is provided with a pair of recesses 70 and 72 on its end opposite the cover 34, the recesses 70 and 72 being aligned with the openings 66 and 68, respectively. One of the recesses, here recess 72, accommodates an alignment pin in the form of the tube 60 to align the opening 68 centrally within the surface 46 and the bar 44. If it is desired to have access to the opening 68 rather than the opening 66, the recess 70 will be positioned to accommodate the portion of the tube 60 which extends into the channel 28.

The scanning head 12 may simply be withdrawn from the channel 28 in the support member 30 for cleansing, inspection, decontamination, or any other purpose. It is assured that the scanning head 12 will be properly oriented relative to the anode wire 57 and the support member 30 since the tube 60 abuts the end of the scanning head 12 when it is fully inserted into the channel 28.

Figure 4 illustrates the openings 66 and 68 provided with windows 74 and 76, respectively. It is not necessary, however, to employ windows for the scanner, and the windows have been omitted in Figure 5.

As illustrated in Figure 1, the tape 10, or elongated strip, rests upon the scanning head 12 between the flange 42 and the support member 30, the tape 10 being allowed to conform with the outer surface of the tube 32 and entirely cover the accessible opening, here opening 66. As a result, a relatively small amount of gas will escape from the tube 32 through the opening 66, even in the absence of a window 74. The gas source 20 supplies a constant flow of gas into the tube 32 through the tube 60, the flow of gas exiting from the tube 32 principally through the stem 40 in the cover 34. As a result, the tube 32 is constantly flushed with a flow of ionizable gas, and the leakage of gas through the opening 66 will not affect the operation of the scanner 14. In order to be assured that the atmosphere within the tube 32 is not contaminated by the ambient atmosphere, the pressure of the gas in the tube 32 is maintained above atmospheric pressure. For this purpose, a flexible tube 78 is connected to the stem 40 and terminates beneath the surface of a volume of water 80 in an open test tube 82. This construction forms a bubbler, and when bubbles emerge from the flexible tube 78 and pass through the water 80 in the test tube, it is certain that there is an essentially air free atmosphere within the tube 32. When windows are employed it is not required that a bubbler be employed. The support member 30 is provided with an aperture 84 for accommodating the test tube 82.

It is also desirable to make the height of the scanner 14 relative to the stand readily adjustable, and for this reason, the stand 16 is slidably disposed within an aperture 86 in the support member 30 adjacent to the aperture 84, and a key 88 is threaded into the support member 30 to extend into the aperture 86, thus making it possible to lock the scanner 14 to the stand 16.

It is clear, that the tape 10 may be positioned and moved relative to the scanning head 12 by hand, and the position of the radiation peaks noted manually. For analytical work, it is perhaps preferable to position the tape 10 manually, since the sensitivity of the scanning head may readily be changed by merely rotating the tube 32 to position the desired opening 66 or 68 adjacent to the radiation peak under investigation. However, for certain types of work, it may be desirable to minimize the operators' attention. In this case, a weight 90 is attached to one end of the tape 10, and a flexible cord 92, preferably of nylon because of its non-shrinkability, is attached to the other end of the tape 10. The cord 92 is secured to a drive wheel 94 coupled to the driving mechanism of the recorder 22 through a suitable linkage, such as pulleys 96 and 98. It is thus clear that operation of the recorder 22 will be effective to pull the tape 10 across the opening 66 in the tube 32 and simultaneously produce a trace, indicated at 100 on the recorder, which will show the relative locations and intensity of the radiation peaks on the tape 10.

A suitable gas for the atmosphere within the tube 32 has been found to be a mixture of helium and isobutane, 99% helium and 1% isobutane as a quenching agent have been found to be satisfactory. A number of suitable gases of this type are available commercially. When windows 74 and 76 are employed, a polyvinylidene chloride compound (such as "Saran" produced by Dow Chemical Co., U.S.A.) with a thickness of 1 or 2 milligrams per square centimeter has been found to be particularly suitable, since it will adhere to this outer surface of the tube 32 without grease or cement. The window need not be conductive, since the windows are relatively small compared to the size of the active region of the scanner 14. Another suitable material for the windows is "Mylar" (produced by E. I. du Pont de Nemours & Co., U.S.A.) with a thickness of 0.8 milligram per square centimeter; however, a thin layer of grease must be applied to the exterior surface of the tube 32 to secure the Mylar thereto. Other suitable materials for the window are Kodapak sheet (Eastman Kodak Company), Formwar, rubber chloride, Scotch tape.

In one particular construction of the scanner 14, the tube 32 has a total length of 3.100 inches, neglecting the length of the stem 40, the distance from the flange 42 to the opposite end of the tube 32 being 2.600 inches. The outer diameter of the tube 32 is 0.625 inch and the tube thickness is 0.120 inch. The tube 32 is constructed of seamless brass tubing and the flange 42 has a diameter of ¾ inch approximately. The openings 66 and 68 are each 1 inch long and are disposed a distance of 1.34 inches from the open end of the scanning head 12. The larger window 66 has a width of 0.250 inch while the narrower window 68 has a width of 0.063 inch. The rod 56 is constructed of brass 1/16 inch in diameter, and the anode wire 57 is tungsten with a diameter of 0.004 inch, although stainless steel is also suitable. The anode wire 57 extends a distance of 2⅜ inches into the tube 34 from the end of the channel 28 to which the connector 48 is sealed. Also, the ball 58 at the end of the anode wire 57 is constructed of electrically conducting material such as metal, metallized glass or plastic, colloidal graphite, printed circuit paints, and has a diameter of approximately 1/16 to 3/16 inch. In all cases, the ball 58 must be at least two times the diameter of the anode wire 57. With this construction, the scanner 14 operates as a counter at a potential of 1,000 to 1,300 volts.

The windows are preferably resistant to organic solvents, alkalis and acids probably present on the strip to be scanned in contact with the window. It was found that these properties are met by windows made from thin sheets of vinylidene chloride-vinylchloride copolymer; furthermore by thin sheets of polyethylene thereptalat.

It is also an aim of the invention to provide a thin window which can without requiring special skill quickly be exchanged, should it become contaminated through its direct contact with the strip to be scanned.

For this purpose, two alternative solutions are provided in the invention:

(1) The area around the window opening is of cylindrical shape. An elastic window material stretched over this convex shape will stay on it and seal the counter opening without the application of a cementing material if the film (window material) has a proper elongation factor, bending endurance and clinging property. It was found that vinylidene chloride-vinylchloride copolymer films which have an elongation of at least 40%, a folding endurance of better than 400,000 cycles (with 1 kg. load) and can be obtained under the trade name of "Pantex" (Pantasot Co., New York), "Reet" (Ross & Roberts Co., Stratford, Conn.), "Saran" (The Dow Chemical Co., Midland, Mich.) are suitable for this purpose. Particularly type 517 Saran film is useful on account of its great clinging property.

(2) The second alternative solution is particularly advantageous when very thin windows have to be used for scanning strips with very soft beta radiations. In this alternative the film is fastened and sealed to the scanning head with a high viscosity grease which has a low vapor pressure. Due to the fact that greases do not have the same good sticking properties as cements and lacquers used for fastening windows in end-window couters, furthermore that the strip to be scanned is in immediate contact with the window film and during the scanning procedure, the strip therefore conveys through friction a force trying to displace the window film, special precautions have to be observed. The friction between the strip and the film is proportional to the friction coefficient between strip and film material and the normal force exerted upon it, but independent from the contact area between them. To decrease the friction force a film with smooth surface and low clinging properties should be used. The easy application of extremely thin films require moreover films with great tensile strength. Experiments showed that polyethylene thereptalat film available under the trade name of "Mylar" (Du Pont de Nemours & Co., Wilmington, Delaware) is suitable. It has a very smooth surface, low clinging property, and a tensile strength above 15,000 p.s.i. The friction between film and scanning head on the other hand is proportional to the contact area and the viscosity of the grease applied between them. The scanning head has therefore to be designed in a manner that the contact area between film and scanning head should be large and a high viscosity vacuum grease should be used. To satisfy these conditions a contact area of at least ¼ sq. in. is necessary and furthermore the contact area has to extend around the counter opening in each direction with at least ¼ in. width. Commercially available vacuum greases, particularly silicon greases proved to be satisfactory.

It will readily be appreciated that the scanner here disclosed is particularly suitable to fulfill the innumerated objects. Further, the scanning head 12 may be readily contaminated, since it may simply be removed from the support member 30 and placed in a decontamination bath. This is particularly important, since it may be desirable to operate the scanner 14 without windows. Since operation without windows is practical, low energy beta particles, such as those from $C^{14}$, $S^{35}$, $Ca^{45}$, and $H^3$ may be readily and efficiently detected. Further, the bar 44 performs the dual function of shielding the opening not in use, here opening 68, to prevent a high background count from appearing, and also a mechanical support for the tube 32. This construction makes it possible to provide more than one opening to the active region of the counter, and to make it possible to switch from one opening to the other without removing the tape from the counter.

The man skilled in the art will readily devise many other devices within the intended scope of this invention. It is therefore intended that the scope of the invention be not limited by the foregoing specific disclosure, but rather only by the intended claims.

The invention claimed is:

1. A radiation measuring device comprising a support member having a cylindrical channel extending therein, a rod of electrically conducting material mounted on the support member, said rod extending coaxially out of the channel in the support member, a hollow cylindrical tube of electrically conducting material snugly disposed in the channel in the support member and being slidably removable therefrom, said tube extending from the support member, surrounding all portions of the rod, being electrically insulated from the rod, and having a pair of openings on opposite sides thereof exterior to the support member, and a bar shaped shield mounted on the support member and extending therefrom in abutment with the tube, the surface of said shield confronting the tube being curved to conform to the exterior surface of the tube, and said shield being of sufficient width to entirely cover the openings in the tube.

2. A radiation measuring device comprising a support member having a cylindrical channel closed at one end extending therein, a rod of electrically conducting material mounted to the support member and extending coaxially out of the open end of the channel in the support member, a hollow cylindrical tube of electrically conducting material snugly disposed in the channel in the support member and being slidably removable therefrom, said tube being open at both ends, extending from the support member, surrounding all portions of the rod, being electrically insulated from the rod, and having an opening therein exterior to the support member, means to introduce an ionizable gas into the channel adjacent to its closed end, whereby gas will flow through the tube and out of the end thereof opposite the support member, and an elongated strip adapted to carry radioactive material disposed in contact with the exterior surface of the tube confronting the opening.

3. A radiation measuring device comprising a support member having a cylindrical channel extending therein and closed at one end, a rod of electrically conducting material mounted to the support member and extending coaxially out of the open end of the channel in the support member, a cylindrical hollow tube of electrically conducting material open at both ends, one end of said tube having a pair of recesses therein on opposite sides thereof and being snugly disposed in the channel in the support member, said tube being slidably removable from the support member and extending from the support member, surrounding all portions of the rod, being electrically insulated from the rod, and having a pair of openings on opposite sides thereof aligned with the recesses therein, the openings being disposed exterior to the support member, a bar shaped shield mounted to the support member and extending therefrom in abutment with the tube, the surface of said shield confronting the tube being curved to conform to the exterior surface of the tube and having a width greater than the width of the openings in the tube, a pin disposed in the channel of the support member adjacent to the closed end thereof and aligned with the shield, said pin being disposed within one of the recesses in the end of the tube, and means to inject an ionizable gas into the channel adjacent to the closed end thereof, whereby the gas will flow outwardly through the channel and out of the end of the tube opposite the support member.

4. A radiation measuring device comprising a support member having a cylindrical channel extending therethrough, an electrical connector sealed to one end of the channel having a terminal disposed on the axis of the channel, a rod of electrically conducting material mounted to the terminal of the connector and extending coaxially out of the open end of the channel in the support member, a hollow cylindrical tube of electrically conducting material open at one end and having a cover with a small central aperture in the other end, the end of the tube opposite the cover having a pair of recesses therein on opposite sides thereof and being snugly disposed in the channel in the support member, slidably removable from the support member, and said tube extending from the support member, surrounding all portions of the rod, being electrically insulated from the rod, and having a pair of openings on opposite sides thereof aligned with the recesses therein, said openings being exterior to the support member, a bar shaped shield mounted to the support member having a curved surface conforming to the tube abutting the portion of the tube exterior to the support member, said shield having sufficient width to cover the openings in the tube, a hollow pin extending through the support member into the channel adjacent to the electrical connector, said pin being disposed in one of the recesses in the end of the tube, and being aligned with the central axis of the shield, whereby a source of ionizable gas may be connected to the pin, flown through the tube, and out of the aperture in the cover of the tube.

5. A radiation measuring device comprising the elements of claim 4 in combination with a thin window constructed of material transparent to beta particles disposed on the exterior surface of the tube confronting each of the openings therein.

6. A radiation measuring device comprising the elements of claim 4 in combination with a ball of electrically conducting material disposed on the end of the rod opposite to the support member, said ball being at least twice the diameter of the rod.

7. A radiation measuring device comprising the elements of claim 4 where the support member has a bore extending therethrough in combination with a vessel disposed in the bore, a mass of liquid disposed within the vessel, and a hollow tube connected at one end to the aperture in the cover of the tube and having its other end immersed in the liquid.

8. A radiation measuring device comprising the elements of claim 4 in combination with a thin window constructed of polyvinylidene chloride compound disposed on the exterior surface of the tube confronting each of the openings therein.

9. A radiation measuring device comprising a support member having a cylindrical channel extending therein, a rod of electrically conducting material mounted to the support member, said rod extending coaxially out of the channel in the support member, a hollow cylindrical tube of electrically conducting material snugly disposed in the channel in the support member and being slidably removable therefrom, said tube extending from the support member, surrounding all portions of the rod, being electrically insulated from the rod, and having an opening therein exterior to the support member, and a window in contact with the exterior surface of the tube and confronting the opening with an elongation factor above 40% and folding endurance above 400,000 cycles.

10. A radiation measuring device comprising the elements of claim 9 wherein the window comprises vinylidene chloride.

11. A radiation measuring device comprising the elements of claim 9 wherein the window comprises a vinyl chloride copolymer.

12. A radiation measuring device comprising a support member having a cylindrical channel extending therein, a rod of electrically conducting material mounted to the support member, said rod extending coaxially out of the channel in the support member, a hollow cylindrical tube of electrically conducting material snugly disposed in the channel in the support member and being slidably removable therefrom, said tube extending from the support member, surrounding all portions of the rod, being electrically insulated from the rod, and having an opening therein exterior to the support member, and a window in contact with the exterior surface of the tube and confronting the opening having a tensile strength above 15,000 p.s.i., and a layer of high-viscosity grease disposed between the window and the tube.

13. A radiation measuring device comprising the elements of claim 12 wherein the window comprises polyethylene thereptalat.

14. A radiation measuring device comprising a support member having a cylindrical channel extending therein, a rod of electrically conducting material mounted to the support member, said rod extending coaxially out of the channel in the support member, a hollow cylindrical tube of electrically conducting material snugly disposed in the channel in the support member and being slidably removable therefrom, said tube extending from the support member, surrounding all portions of the rod, being electrically insulated from the rod, and having an opening therein exterior to the support member, and a polyethylene thereptalat window in contact with the exterior surface of the tube and confronting the opening having a thickness no greater than 2 milligrams per square centimeter, and a layer of grease disposed between the window and the tube.

15. A radiation measuring device comprising a support member, a rod of electrically conducting material extending from the support member, a hollow tube of electrically conducting material mounted about the support member having an opening therein confronting the rod, said tube surrounding all portions of the rod and being electrically insulated therefrom, and a strip adapted to contain radioactive material confronting the opening in the tube and in contact with the exterior perimeter of the opening to restrict the ambient atmosphere from the interior of the tube.

16. A radiation measuring device comprising the elements of claim 15 in combination with means for flowing an ionizable gas through the tube.

17. A radiation measuring device comprising a support member, a rod of electrically conducting material mounted on the support member and extending outwardly therefrom, a hollow cylindrical tube of electrically conducting material rotatably mounted on the support member and extending therefrom coaxially about the rod, said tube surrounding all portions of the rod, being electrically insulated from the rod, and having a pair of openings on opposite sides thereof confronting the rod, and a bar shaped shield mounted on the support member and extending therefrom in abutment with the tube, the surface of said shield confronting the tube being curved to conform to the exterior surface of the tube, and the shield being of sufficient width to entirely cover the openings in the tube.

References Cited in the file of this patent

UNITED STATES PATENTS

| | | |
|---|---|---|
| 2,465,821 | Smoluchowski | Mar. 29, 1949 |
| 2,499,830 | Molloy | Mar. 7, 1950 |
| 2,596,080 | Raper et al. | May 6, 1952 |
| 2,617,955 | Mandeville et al. | Nov. 11, 1952 |
| 2,622,208 | Bernstein et al. | Dec. 16, 1952 |
| 2,638,560 | Borkowski | May 12, 1953 |
| 2,656,476 | Firminhac | Oct. 20, 1953 |
| 2,683,234 | Lynch | July 6, 1954 |
| 2,767,326 | Stratford | Oct. 16, 1956 |
| 2,776,378 | Youmans | Jan. 1, 1957 |
| 2,776,390 | Anton | Jan. 1, 1957 |

OTHER REFERENCES

"An Automatic Scanner for Paper Radiochromatograms," by Soloway et al., Nucleonics, vol. 10, No. 4, April 1952, pages 52 and 53.

Apparatus for Automatically Scanning Two-Dimensional Paper Chromatograms for Radioactivity by Wingo-Analytical Chemistry, col. 26, No. 9, September 1954, pages 1527–1528.

A Collimated Windowless Geiger Counter for Scanning Chromatograms, by Bangham, Biochemical Journal, vol. 62, No. 4, 1956, pp. 550–551.